United States Patent
Yanagi

(10) Patent No.: US 8,218,747 B2
(45) Date of Patent: Jul. 10, 2012

(54) TELEPHONE DEVICE

(75) Inventor: Satoru Yanagi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 668 days.

(21) Appl. No.: 12/393,061

(22) Filed: Feb. 26, 2009

(65) Prior Publication Data

US 2009/0220061 A1   Sep. 3, 2009

(30) Foreign Application Priority Data

Feb. 28, 2008   (JP) .................................. 2008-048500

(51) Int. Cl.
*H04M 3/42* (2006.01)
(52) U.S. Cl. .......... 379/201.01; 379/207.02; 379/142.04
(58) Field of Classification Search ............. 379/142.04, 379/142.05, 219, 201.02, 88.19, 201.01, 379/207.02, 156, 164, 166, 167.01, 419; 370/352

See application file for complete search history.

(56) References Cited

U.S. PATENT DOCUMENTS

| | | | |
|---|---|---|---|
| 6,882,714 B2 | 4/2005 | Mansfield | |
| 7,065,197 B1 * | 6/2006 | Ramella-Pezza et al. ........................ | 379/201.02 |
| 7,162,022 B2 | 1/2007 | Jupe et al. | |
| 7,333,496 B1 * | 2/2008 | Patel et al. ............... | 370/395.42 |
| 7,436,947 B2 * | 10/2008 | Ordille et al. .................. | 379/219 |
| 2004/0151165 A1 | 8/2004 | Ezumi | |
| 2005/0063523 A1 | 3/2005 | Jupe et al. | |
| 2007/0172042 A1 * | 7/2007 | Winikoff et al. ......... | 379/142.05 |

FOREIGN PATENT DOCUMENTS

EP   0-999683   10/1999

(Continued)

OTHER PUBLICATIONS

JP Office Action dtd May 11, 2010, JP Appln. 2008-048500, English translation.

(Continued)

*Primary Examiner* — Vivian Chin
*Assistant Examiner* — Friedrich W Fahnert
(74) *Attorney, Agent, or Firm* — Banner & Witcoff, Ltd.

(57) ABSTRACT

A telephone device may be provided with a status storage device, a call request receiving device, a selectable information sending device, a selected result information receiving device, a first notice instruction sending device, a receiver device specifying device, and a second notice instruction sending device. The status storage device may be configured to store a status of each of a plurality of receiver devices. The call request receiving device may be configured to receive a call request. The selectable information sending device may be configured to send selectable information for selecting one type of call request from among a plurality of types of call requests to a source of the call request. The selected result information receiving device may be configured to receive selected result information sent from the source. The first notice instruction sending device may be configured to send a call request notice instruction to all of the plurality of receiver devices when the selected result information is a first type of call request. The receiver device specifying device may be configured to specify a receiver device having an idle status based on the stored contents of the status storage device when the selected result information is a second type of call request. The second notice instruction sending device may be configured to send the call request notice instruction to the receiver device specified by the receiver device specifying device.

7 Claims, 9 Drawing Sheets

FOREIGN PATENT DOCUMENTS

| | | |
|---|---|---|
| EP | 1770941 A1 * | 4/2007 |
| JP | 09-205495 A | 8/1997 |
| JP | 2001-024813 | 1/2001 |
| JP | 2001-024815 | 1/2001 |
| JP | 2003-188996 | 7/2003 |
| JP | 2003-283658 A | 10/2003 |
| JP | 2003-289399 | 10/2003 |
| JP | 2004-229132 | 8/2004 |
| JP | 2005-509374 T | 4/2005 |
| JP | 2007-166393 A | 6/2007 |
| WO | 02/093886 A2 | 11/2002 |
| WO | 03/058931 A1 | 7/2003 |
| WO | 2004/039048 A2 | 5/2004 |

OTHER PUBLICATIONS

Extended EP Search Report dtd Jun. 24, 2009, EP Appln. 09250525.4.

* cited by examiner

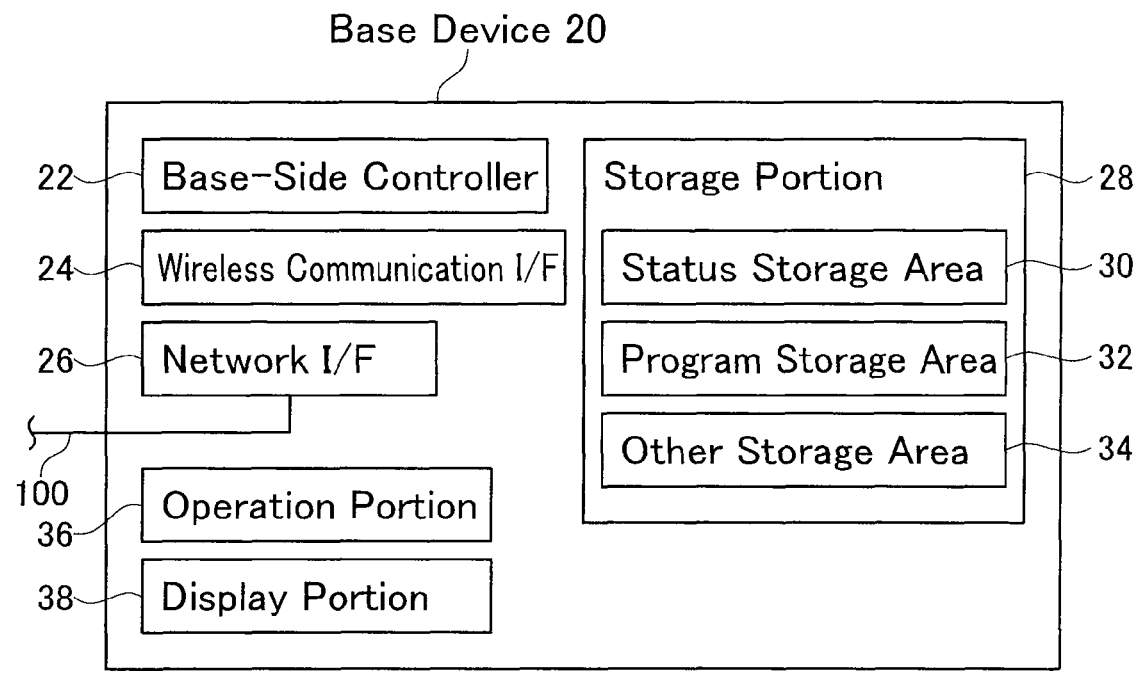

TELEPHONE DEVICE

CROSS-REFERENCE TO RELATED APPLICATION

This application claims priority to Japanese Patent Application No. 2008-048500, filed on Feb. 28, 2008, the contents of which are hereby incorporated by reference into the present application.

BACKGROUND OF THE INVENTION

1. Field of the Invention

The present invention relates to a telephone device for carrying out a call request notice upon receiving a call request sent from another telephone device. It should be noted that the terminology "call request notice" shall be interpreted in its broadest sense, and is a concept comprising a variety of possible techniques for notifying a user that a call request has been received. For example, outputting a sound (ringing), vibrating, displaying a prescribed message, or changing the lighting pattern of a lamp may be referred to as examples of a "call request notice".

2. Description of the Related Art

EP0999683A2 discloses a system in which a facsimile device and a plurality of handset devices exist in a single extension network. Upon receiving a call request, the facsimile device sends a call request notice instruction to a handset device that is not in use (i.e. a handset device that is idling). This makes it possible to ring the idle handset device.

SUMMARY OF THE INVENTION

For example, there may be an occasion in which a user (caller) wishes to make a phone call in an urgent business, and in other occasions make an ordinary phone call. The above-mentioned prior art system behaves the same (i.e. rings the idling handset device) regardless of the intentions of the caller. That is, in the system of the above-mentioned prior art, it is not possible to carry out a call request notice that reflects the intention of the caller. In this specification, a telephone device that makes it possible to carry out a call request notice that reflects the intention of the caller is provided.

The telephone device disclosed in this specification may comprise a status storage device; a call request receiving device; a selectable information sending device; a selected result information receiving device; a first notice instruction sending device; a receiver device specifying device; and a second notice instruction sending device. Furthermore, the telephone device may carry out telephone communications using the PSTN (Public Switched Telephone Network) or ISDN (Integrated Services Digital Network); alternately, it may carry out telephone communications using an IP network. That is, the telephone device may be an ordinary telephone or an IP telephone. Further as another alternative, the telephone device may carry out telephone communications by using both the PSTN and the IP network.

The status storage device may store a status for each of a plurality of receiver devices. For example, the status storage device may store one of two types of status: the busy status and the idle status, for each of a plurality of receiver devices. Further, for example, the status storage device may store one of three or more types of statuses (for example, power OFF status, busy status, call request sending status, call request notifying status, idle status) for each of the plurality of receiver devices.

The call request receiving device may receive a call request. The selectable information sending device may send selectable information for selecting one type of call request from among a plurality of types of call requests to the source of the call request received by the call request receiving device. The selectable information may include information by which a desired type of call request may be selected on the source side by the call request source user (the user or caller who made the telephone call). The format of the selectable information is not particularly limited. For example, the selectable information may be voice data or text data. In the former case, a voice message may be outputted at the source of the call request. In this case, the call request source user can select the type of call request in accordance with the voice message (for example, the user can make a selection using a key operation). Conversely, in the latter case, text data may be displayed at the source of the call request. In this case, the call request source user can select the type of call request in accordance with the text data (for example, the user can make a selection using a key operation).

The selected result information receiving device may receive the selected result information sent from the above-mentioned source. The first notice instruction sending device may send a call request notice instruction to all of the above-mentioned plurality of receiver devices when the selected result information received by the selected result information receiving device is a first type of call request. Furthermore, for example, the telephone device may be a base device with which one or more handset device can be utilized together. In this case, the receiver device of the base device may be a cordless type (e.g. identical to the handset device), or alternatively, may be a configuration that is connected with the base device main unit via a wire. In the former case, the first notice instruction sending device may send a call request notice instruction to the receiver device of the base device (upon which the same call request notice instruction may be sent to the receiver device of the handset device). Alternately in the latter case, for example, the first notice instruction sending device may send a call request notice instruction to a sound output circuit that outputs a sound from a speaker of the base device main unit. In this case, the above-mentioned sound output circuit may be considered to be one element configuring the receiver device of the base device.

The receiver device specifying device may specify a receiver device having an idle status based on the stored content of the status storage device when the selected result information received by the selected result information receiving device is a second type of call request. Furthermore, the above-mentioned idle status denotes that the receiver device is not in use (e.g. not busy, not notifying a call request, nor receiving a call request). Furthermore, when the power OFF status exists, there are no limitations on how to deal with the power OFF status. That is, the power OFF status may be regarded as either the idle status or the busy status; or alternately, the power OFF status can be regarded as being neither the idle status nor the busy status. In any of the above cases, the second notice instruction sending device may send the call request notice instruction to the receiver device specified by the receiver device specifying device.

According to the above-mentioned telephone device, it is possible to send the above-mentioned selectable information to the source of the call request. The user of the source of the call request may thereby select the type of the call request in accordance with the selectable information. For example, the user may select the first type of call request when placing an urgent phone call, and may select the second type of call request when not in such a haste. When the first type of call request is selected, the call request notice instruction may be sent to all of the receiver devices. That is, the call request notice instruction may not be sent not only to an idling receiver device, but also to a receiver device having a status of being busy. Upon receiving the call request notice instruction, the receiver device having the busy status may carry out a prescribed call request notice. For example, the receiver device may carry out a call waiting format notice (e.g. a sound notice), may display a prescribed message, or may vibrate. On the other hand, when the second type of call request is selected, the call request notice instruction may be only sent to the receiver device having the idle status. That is, the call request notice instruction may not be sent to the receiver device having the busy status. In this case, since a call request notice is not carried out for a receiver device having the busy status, the talking on the receiver device is not interrupted. According to this telephone device, it is possible to carry out a call request notice that reflects the intention of the user placing the phone call.

BRIEF DESCRIPTION OF THE DRAWINGS

FIG. 2 shows an example of a base device configuration;
FIG. 3 shows an example of the stored contents of a status storage area.

DESCRIPTION OF THE PREFERRED EMBODIMENTS

Figure 1:
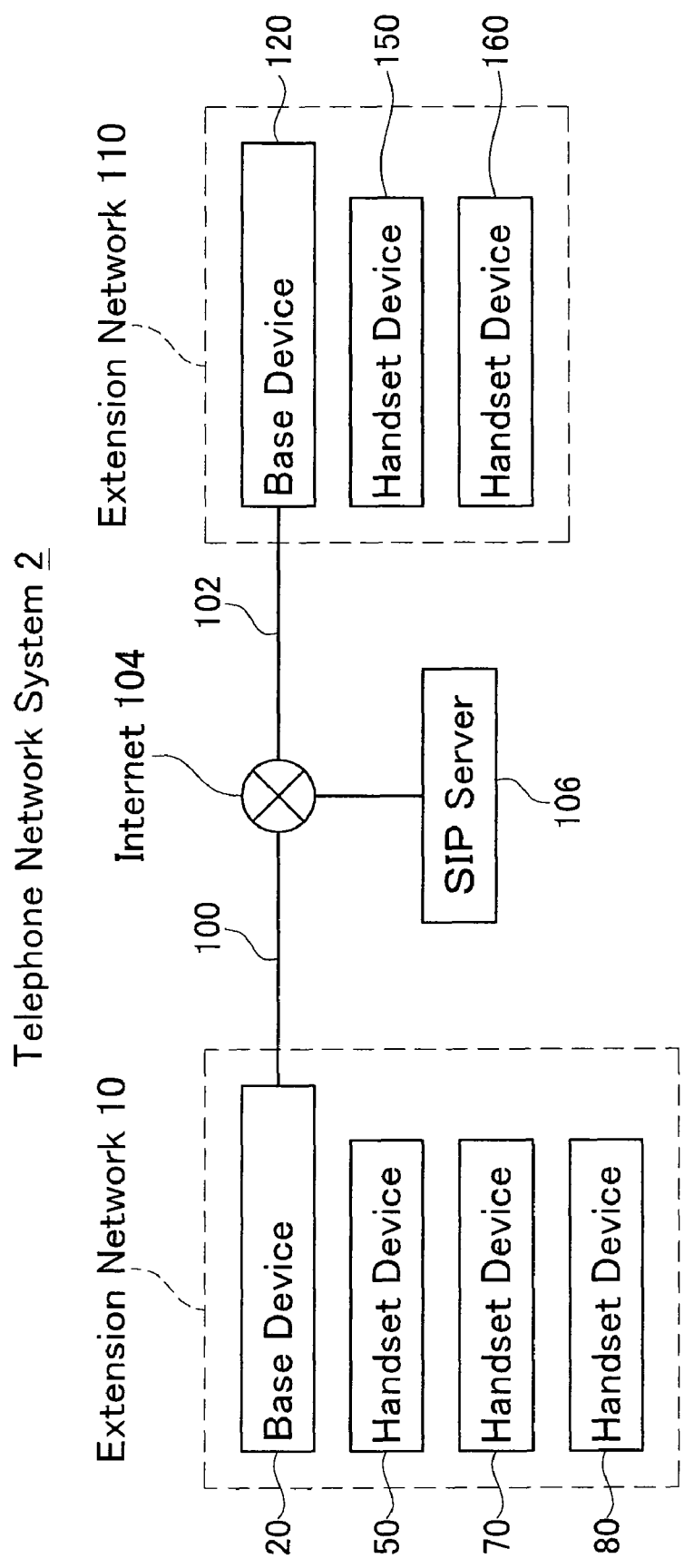
FIG. 1 shows an example of a telephone network system configuration.

The embodiment will be explained by referring to the drawings. FIG. 1 shows a telephone network system 2 of this embodiment. The telephone network system 2 comprises a plurality of extension networks 10, 110, the Internet 104, and a SIP server 106. Only two extension networks 10, 110 are shown in FIG. 1, but in actuality there may be a large number of extension networks.

A plurality of SIPURIs is allocated to the extension network 10. The extension network 10 has a base device 20 and a plurality of handset devices 50, 70, 80. Furthermore, the SIPURI is not individually assigned to the respective handset devices 50, 70, 80, but rather a plurality of SIPURIs is assigned to the unit composed of the extension network 10. The base device 20 is connected to the Internet 104 (IP network). It is possible for the respective handset devices 50, 70, 80 configuring the extension network 10 to carry out a telephone communication using the Internet 104. That is, the extension network 10 is an IP telephone.

Further, a plurality of SIPURIs is also allocated to extension network 110. Extension network 110 has a base device 120 and a plurality of handset devices 150, 160. The base device 120 is connected to the Internet 104. It is possible for the respective handset devices 150, 160 configuring the extension network 110 to carry out the telephone communication using the Internet 104. That is, the extension network 110 is also an IP telephone.

The SIP server 106 stores the SIPURI of the respective extension networks 10, 110 (that is, the telephone identification information of the respective extension networks 10, 110). The SIP server 106 is connected to the Internet 104. The SIP server 106 controls the telephone communications of the respective extension networks 10, 110 using the SIP. That is, the various types of commands communicated between extension network 10 and extension network 110 for the telephone communications are sent via the SIP server 106.

(Base Device Configuration)

The configuration of the base device 20 will be explained. The base device 20 comprehensively controls the telephone communications of the respective handset devices 50, 70, 80. That is, the respective handset devices 50, 70, 80 can carry out the telephone communications outside of the extension network 10 by way of the base device 20. FIG. 2 shows the configuration of the base device 20. The base device 20 has a base-side controller 22, wireless communication interface 24, network interface 26, storage portion 28, operation portion 36, and display portion 38. The base-side controller 22 executes various processing in accordance with a program stored in the storage portion 28. The contents of the processing executed by the base-side controller 22 will be explained in detail below. The wireless communication interface 24 is for wireless communications with the respective handset devices 50, 70, 80. A LAN line 100 is connected to the network interface 26. The LAN line 100 is connected to the Internet 104. The base device 20 can access the Internet 104 via the network interface 26 and the LAN line 100.

The storage portion 28 is configured from ROM, EEPROM, RAM and so forth. The storage portion 28 has a status storage area 30, program storage area 32, and other storage area 34. The status storage area 30 can store a status for each of the plurality of handset devices 50, 70, 80. FIG. 3 shows an example of the stored contents of the status storage area 30. The status storage area 30 can store a plurality of combination data 210, 212, 214. In the respective combination data 210, 212, 214, a handset device ID 200 and a status 202 are associated respectively. The handset device ID 200 specifies the respective handset devices 50, 70, 80. In this embodiment, the handset device ID for handset device 50 is "001", the handset device ID for handset device 70 is "002", and the handset device ID for handset device 80 is "003". Further, four types of status (i.e. IDLE, RINGING, CALLING, TALKING) are used. "IDLE" denotes not in use. "RINGING" denotes that a call request notice is in progress. "CALLING" denotes call request sending. "TALKING" denotes being busy (in talking). The base-side controller 22 monitors the statuses of the handset devices 50, 70, 80. In the initial state, the status of the handset device is "IDLE", and the status changes in accordance with the user carrying out an operation on the handset devices 50, 70, 80. The way in which a status is stored in the status storage area 30 will be explained in detail below.

The program storage area 32 stores programs to be executed by the base-side controller 22. For example, the program storage area 32 stores a program for carrying out telephone communications using SIP. The storage device 34 may store information other than the information that is to be stored in the status storage area 30 and the program storage area 32. The operation portion 36 has a plurality of keys. The user can input various information into the base device 20 by operating the operation portion 36. The display portion 38 can display a variety of information thereon.

(Handset Device Configuration)

Figure 4:
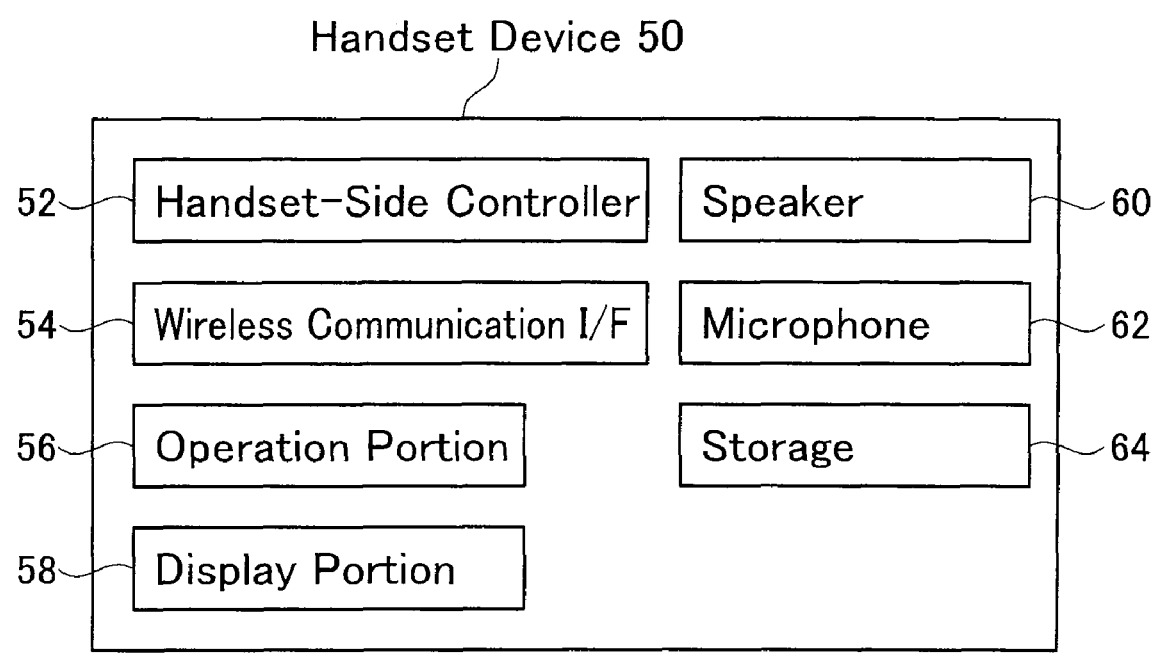
FIG. 4 shows an example of a handset device configuration.

Next, the configuration of the handset device 50 will be explained. The handset devices 70, 80 have the same configuration as the handset device 50. For this reason, detailed explanations of the handset devices 70, 80 will be omitted. The handset device 50 of this embodiment is a cordless type. FIG. 4 shows the configuration of the handset device 50. The handset device 50 has a handset-side controller 52, wireless communication interface 54, operation portion 56, display portion 58, speaker 60, microphone 62, and storage portion 64. The handset-side controller 52 executes various processing in accordance with a program stored in the storage portion 64. The contents of the processing executed by the handset-side controller 52 will be explained below as needed. The wireless communication interface 54 is for wireless communication with the base device 20.

The operation portion 56 has a plurality of keys. For example, the operation portion 56 has a hook key and numeric key pads. When not in use, the handset device 50 is in the on-hook state. When using the handset device 50 to place a phone call, the user can operate the hook key. Consequently, the handset device 50 transitions to the off-hook state. Next, the user inputs the telephone identification information (SIPURI) of the call request destination into the handset device 50 by operating the numeric key pads (or by operating the speed dial function). Consequently, the user is thereby able to place a phone call. Further, the user can set the handset device 50 to the off-hook state by operating the hook key while a telephone call is being placed to the handset device 50 (i.e. during a call request notice). Consequently, the user is thereby able to take a telephone call. Hereinafter, setting the handset device 50 to the off-hook state when a call is being placed to the handset device 50 will be called the "call start operation". Further, the user can set the handset device 50 to the on-hook state by operating the hook key during the busy state. Consequently, the user is thereby able to disconnect the phone call. Hereinafter, setting the handset device 50 to the on-hook state in the busy state will be called the "call completion operation".

The display portion 58 can display a variety of information. The user can make a call using the speaker 60 and the microphone 62. The storage portion 64 stores the program to be executed by the handset-side controller 52. Further, the storage portion 64 can store data and so forth created in the course of the handset-side controller 52 executing a process.

Furthermore, the base device 120 configuring the extension network 110 has the same configuration as base device 20. The base device 120 can access the Internet 104 by way of a LAN line 102. Further, the handset devices 150, 160 configuring the extension network 110 have the same configuration as the handset device 50.

(Call Request Receiving Process)

Figure 5:
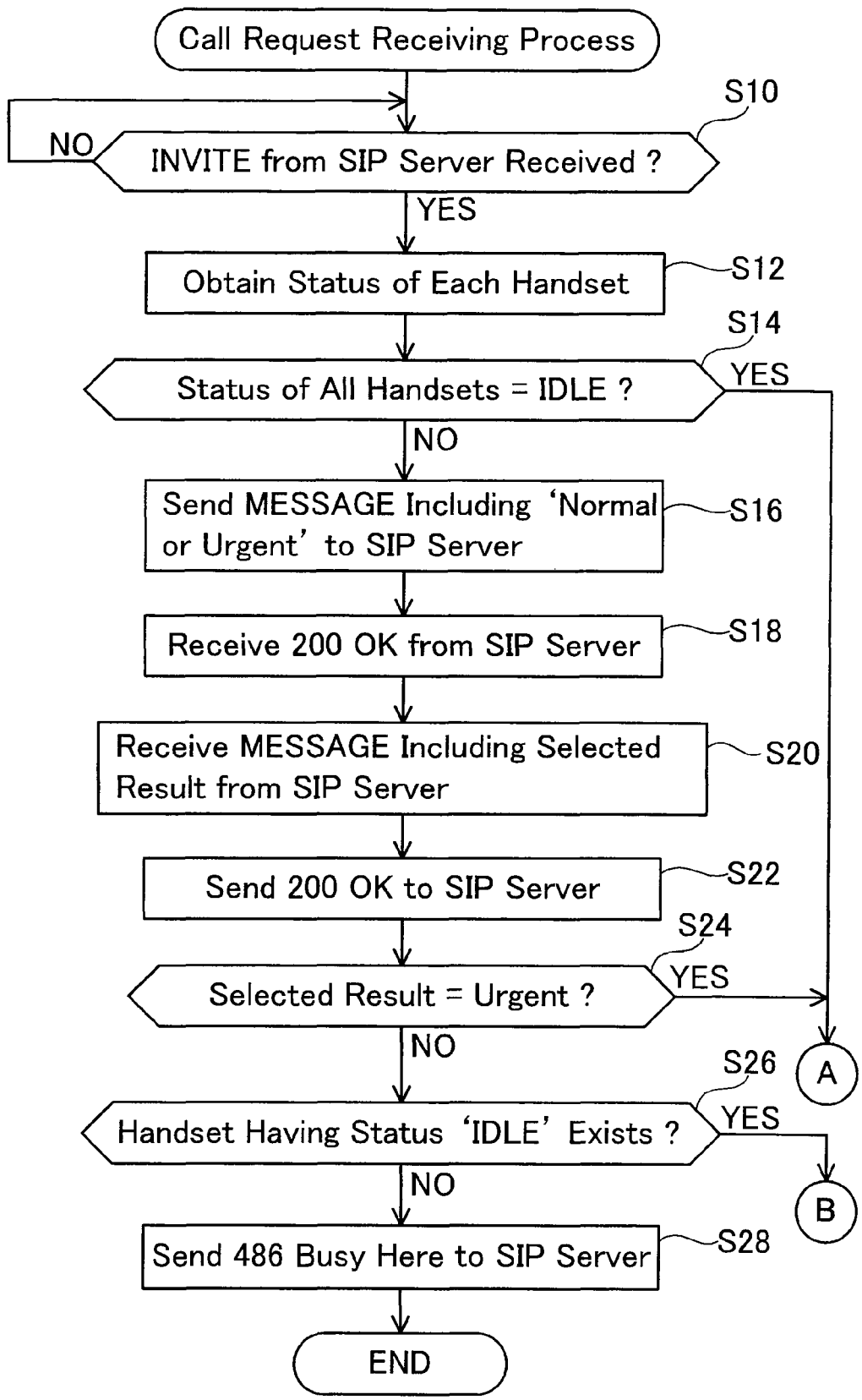
FIG. 5 shows a flowchart of a call request receiving process.
Figure 6:
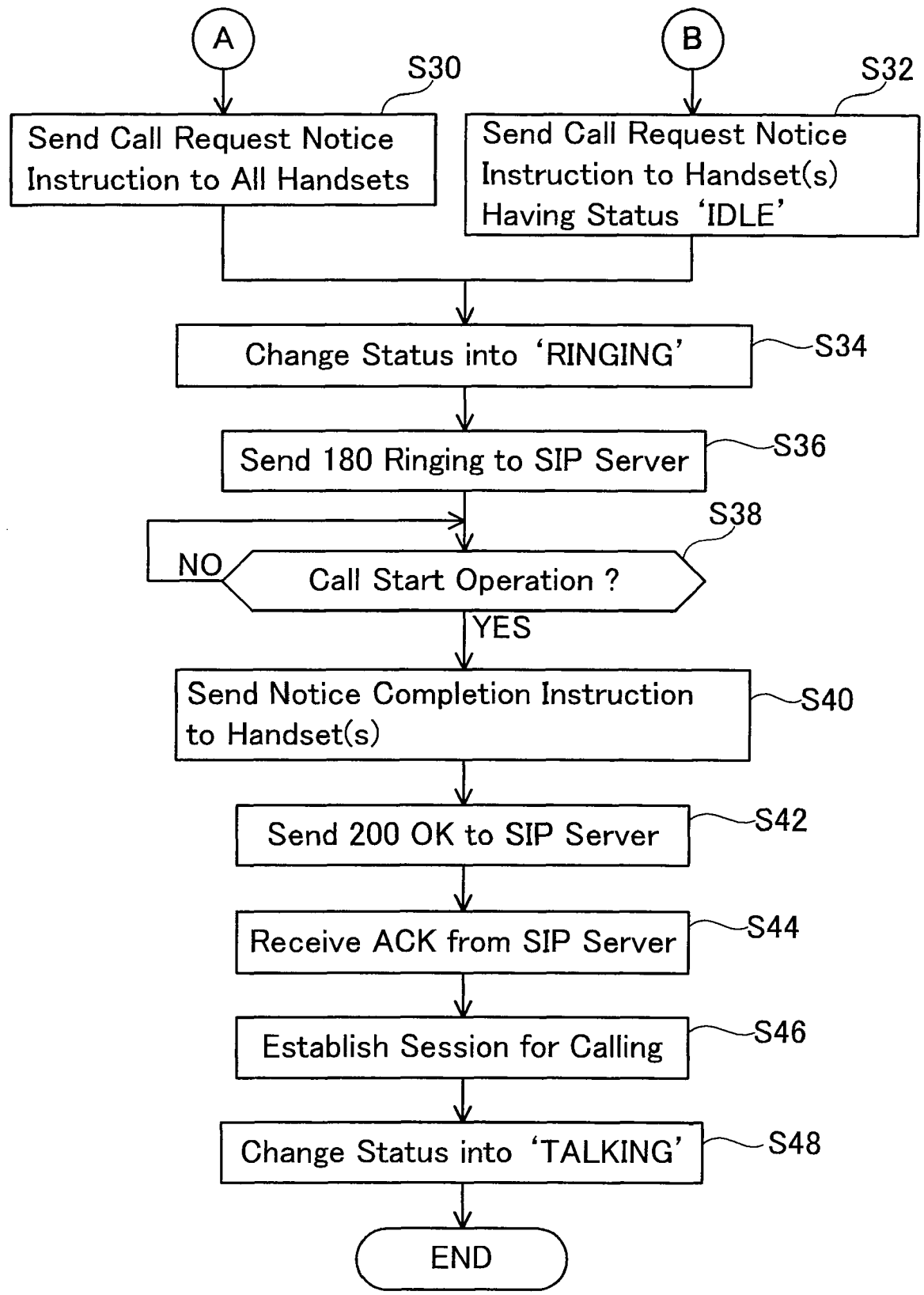
FIG. 6 shows a continuation of the flowchart of FIG. 5.

Next, the contents of the processing executed by the base-side controller 22 will be explained. The contents of the call request receiving process will be explained first. FIGS. 5 and 6 show flowcharts of the call request receiving process. The base-side controller 22 monitors the reception of an INVITE (S10). For example, the user of the extension network 110 can place a telephone call to the extension network 10 by inputting the SIPURI of the extension network 10 into the handset device 150. In this case, an INVITE is sent to the SIP server 106 from the base device 120 of the extension network 110. The INVITE includes the SIPURI of the extension network 110 as the source, and the SIPURI of the extension network 10 as the destination. The SIP server 106, upon receiving the INVITE, transfers the INVITE to the extension network 10. In accordance with this, the base-side controller 22 makes a determination of YES in S10. Furthermore, the further explanation below is given with the example in which the INVITE sent from extension network 110 has been received in S10 in this embodiment.

When the determination in S10 is YES, the base-side controller 22 acquires the statuses of the respective handset devices 50, 70, 80 (S12). The base-side controller 22 acquires the statuses of the respective handset devices 50, 70, 80 by reading out the stored contents of the status storage area 30. Next, the base-side controller 22 determines whether or not the statuses of all the handset devices 50, 70, 80 are "IDLE" (S14). When there is even one handset device that has a status other than "IDLE", the determination in S14 is NO. In this case, processing proceeds to S16. On the other hand, when the determination in S14 is YES, processing jumps to S30 of FIG. 6.

In S16, the base-side controller 22 sends a MESSAGE. At this point, the base-side controller 22 sends the MESSAGE including the text data "Normal or Urgent". That is, the MESSAGE includes a letter string showing that it is an urgent and a letter string showing that it is normal (not being an urgent call). The MESSAGE is received by the SIP server 106. The SIP server 106 transfers the MESSAGE to the extension network 110 (i.e. base device 120).

Upon receiving the above-mentioned MESSAGE, the base device 120, which configures the extension network 110, sends '200 OK' as the response to the MESSAGE. Furthermore, in this embodiment, when the description reads "sends Y as the response to X", this signifies that Y includes information specifying that Y is the response to X, information about the source of Y (i.e. the destination of X) and information about the destination of Y (i.e. the source of X). For example, when the description reads "sends '200 OK' as the response to the MESSAGE", '200 OK' includes information specifying that '200 OK' is the response to the MESSAGE, the SIPURI of the extension network 110 which is the source of '200 OK', and the SIPURI of the extension network 10 which is the destination of '200 OK'. '200 OK' is received by the SIP server 106. The SIP server 106 transfers '200 OK' to the extension network 10. '200 OK' is received by the base device 20 (S18).

The text data included in the MESSAGE is displayed on the handset device of the extension network 110 (specifically, the handset device that had placed the telephone call). That is, "Normal or Urgent" is displayed. The user can carry out an operation for selecting either a normal call or an urgent call. With the selection having been made, the base device 120 sends a MESSAGE including the result of the user's selection. The MESSAGE is received by the SIP server 106, and the SIP server 106 then transfers the MESSAGE to the extension network 10. The MESSAGE is thereby received by the base device 20 (S20). The base-side controller 22 sends '200 OK' as the response to the MESSAGE (S22). '200 OK' is received by the SIP server 106, and the SIP server 106 then transfers '200 OK' to the extension network 110.

Next, the base-side controller 22 determines whether or not the selected result included in the MESSAGE is "Urgent" (S24). When the determination here is YES, processing jumps to S30 of FIG. 6. Conversely, when the determination in S24 is NO (when the selected result is "Normal"), the base-side controller 22 determines whether or not there is a handset device having the status of "IDLE" (S26). The base-side controller 22 makes the determination of S26 by reading out the stored contents of the status storage area 30. When the determination here is YES, processing jumps to S32 of FIG. 6. On the other hand, when the determination in S26 is NO, the base-side controller 22 sends '486 Busy Here' as the response to the INVITE received in S10. '486 Busy Here' is received by the SIP serve 106. The SIP server 106 transfers '486 Busy Here' to the extension network 110. As a result of this, a sound denoting being busy is outputted in the handset device configuring the extension network 110 (in the handset device that placed the phone call). The user thereby knows that the extension network 10 is busy.

In S30 of FIG. 6, the base-side controller 22 sends a call request notice instruction to all of the handset devices 50, 70, 80. Each of the handset devices 50, 70, 80 (i.e. the respective handset-side controllers), upon receiving the call request notice instruction, carries out a call request notice in accordance with its own status. For example, a handset device having the status of "IDLE" outputs a ring sound from the speaker 60. The user thereby knows that a telephone call is incoming. Further, for example, a handset device having a status other than "IDLE" (e.g. "CALLING", "RINGING", "TALKING") outputs a sound that differs from the above-mentioned ringing sound (for example, a call waiting format sound) from the speaker 60. Consequently, the user of the busy handset device knows that another phone call is incoming. When S30 ends, processing proceeds to S34.

On the other hand in S32 of FIG. 6, the base-side controller 22 sends the call request notice instruction to the handset device having the status of IDLE (e.g. the handset device of ID "001" in FIG. 3). In this process, the call request notice instruction is not sent to the handset devices having other statuses (e.g. the handset devices of ID "002" and ID "003" in FIG. 3). The handset device having the IDLE status outputs a ringing sound from the speaker 60. When S32 ends, processing proceeds to S34.

In S34, the base-side controller 22 changes the stored contents of the status storage area 30. Specifically, the base-side controller 22 changes the status of the handset device being the destination of the call request notice instruction of either S30 or S32 to "RINGING". Next, the base-side controller 22 sends '180 Ringing' as the response to the INVITE received in S10 of FIG. 5. '180 Ringing' is received by the SIP server 106, and the SIP server 106 transfers '180 Ringing' to the extension network 110. As a result of this, a sound denoting ringing is outputted in the handset device of the extension network 110 (the handset device that placed the phone call). The user knows that ringing is performed in the extension network 10.

The base-side controller 22 monitors for a call start operation (that is, the operation of the hook key) being executed by any of the handset devices which had been the destination of the call request notice instruction of either S30 or S32 (S38). When the hook key of the handset device is operated while the call request notice is being notified, the operated handset device sends information denoting that a call start operation has been executed to the base device 20. When the base device 20 (specifically, using the wireless communication interface) receives this information, the base-side controller 22 makes a determination of YES in S38. Furthermore, this information includes the ID of the handset device in which the user had executed the call start operation. Thus, the base-side controller 22 knows the handset device in which the user had executed the call start operation.

When the determination in S38 is YES, the base-side controller 22 sends a notice completion instruction to all the handset devices which had been the destination of the call request notice instruction in either S30 or S32 (S40). When receiving the notice completion instruction, the respective handset devices (i.e. the respective handset-side controllers) stop the call request notice. Next, the base-side controller 22 sends '200 OK' as the response to the INVITE received in S10 of FIG. 5 (S42). '200 OK' is received by the SIP server 106, and transferred therefrom to the extension network 110. The base device 120, upon receiving '200 OK', sends an ACK The ACK is received by the SIP server 106, and transferred therefrom to extension the network 10. The ACK is then received by the base device 20 (S44). Consequently, a RTP (Real-time Transport Protocol) communication session for calling is established (S46). As a result of this, it is possible for a call to be carried out between the handset device of the extension network 110 (the handset device that placed the phone call) and the handset device in which the user had executed the call start operation in S38.

Next, the base-side controller 22 changes the stored contents of the status storage area 30 (S48). Specifically, the base-side controller 22 changes the status of the handset device in which the user had executed the call start operation in S38 to "TALKING". Further, the base-side controller 22 returns the statuses of the other handset devices that had been the destinations of the call request notice instruction in either S30 or S32 (i.e. the handset devices in which the user did not execute the call start operation while the call request notice was being executed) to the status prior to the change carried out in S34. The call request receiving process ends when S48 ends.

(Call Request Sending Process)

Figure 7:
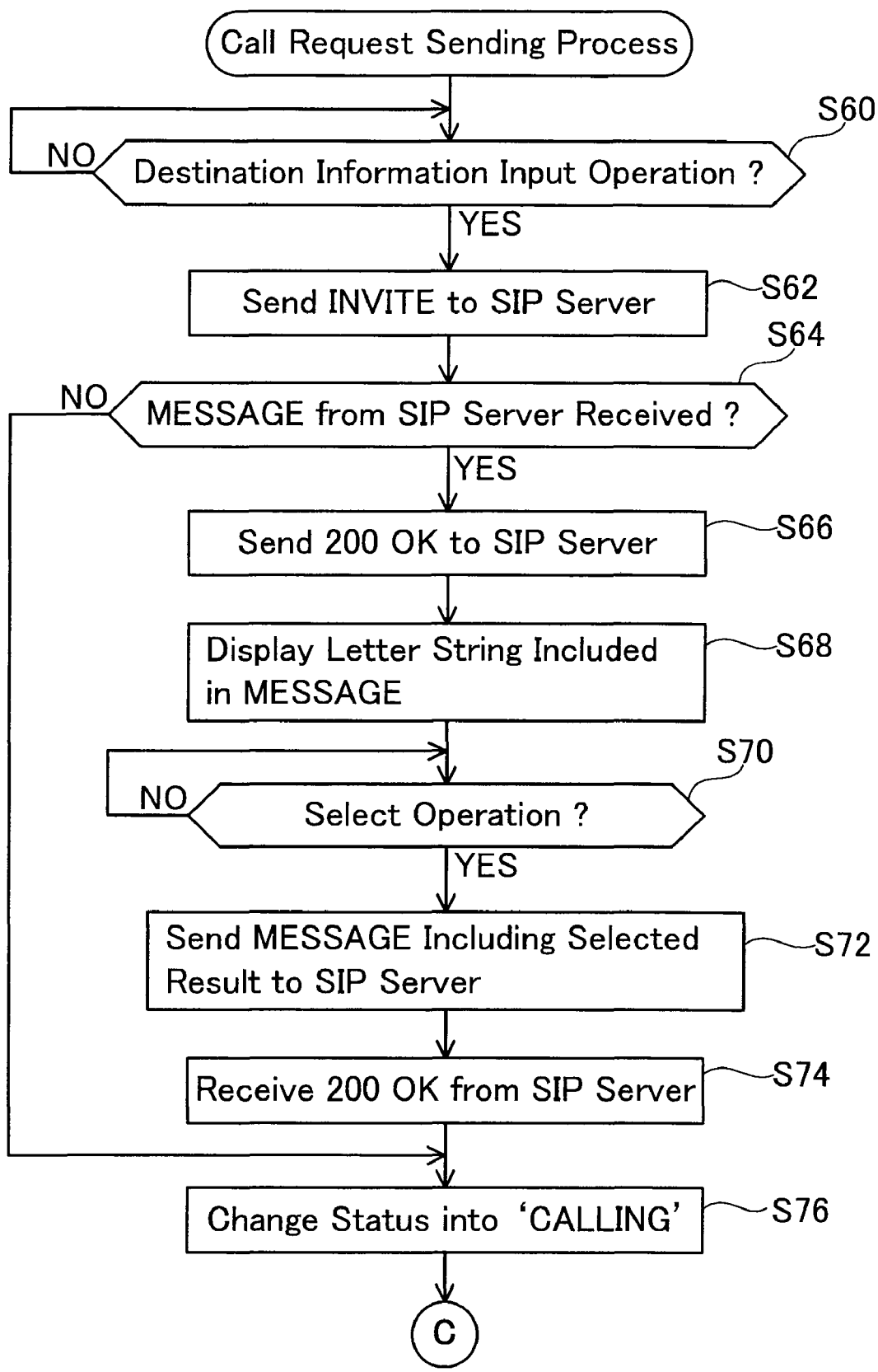
FIG. 7 shows a flowchart of a call request sending process.
Figure 8:
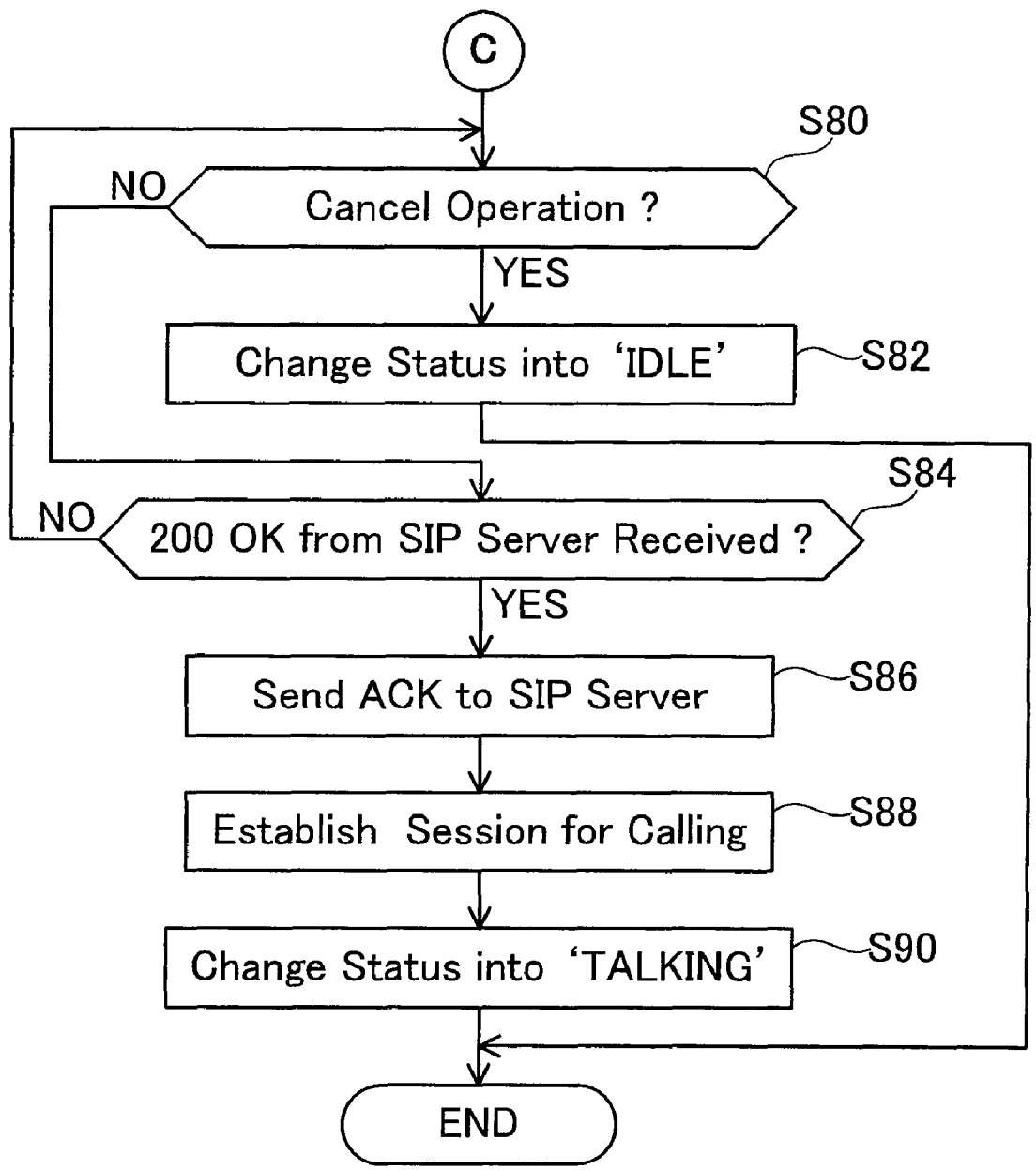
FIG. 8 shows a continuation of the flowchart of FIG. 7.

Next, the contents of the call request sending process will be explained. FIGS. 7 and 8 show flowcharts of the call request sending process. The base-side controller 22 monitors an operation (hereinafter, called the destination information input operation) for inputting call request destination information (i.e. SIPURI) is performed in any of the handset devices 50, 70, 80 (S60). For example, the user who wishes to place a phone call to the extension network 110 can input the SIPURI of the extension network 110 by operating the operation portion 56 of any of the handset devices. The handset device (handset-side controller 52) sends this SIPURI to the base device 20. In this case, a determination of YES is made in S60. In the below explanation of this embodiment, a phone call to the extension network 110 will be given as an example.

When a determination of YES is made in S60, the base-side controller 22 sends an INVITE (S62). The INVITE includes the SIPURI of the extension network 10 as the source, and the SIPURI of the extension network 110 as the destination. The SIP server 106, upon receiving the INVITE, transfers the INVITE to the extension network 110. Next, the base-side controller 22 determines whether or not a MESSAGE has been received (S64). When the base device 120 of the extension network 110 determines NO in S14 of FIG. 5, the MESSAGE is sent to the extension network 10 from the extension network 110 (cf. S16 on FIG. 5). In this case, a determination of YES is made in S64, and processing proceeds to S66. On the other hand, when the base device 120 of the extension network 110 makes a determination of YES in S14 of FIG. 5, the MESSAGE is not sent. In this case, a determination of NO is made in S64, and processing jumps to S76.

In S66, the base-side controller 22 sends '200 OK' as the response to the MESSAGE. '200 OK' is received by the SIP server 106, and then transferred to the extension network 110. '200 OK' is then received by the base device 120 (cf. S18 of FIG. 5). Next, the base-side controller 22 instructs the handset device in which the destination information input operation had been executed in S60 to display the text data included in the MESSAGE (S68). As a result of this, "Normal or Urgent" is displayed in the display portion 58 of the handset device. The user can carry out an operation to select which type of call request is intended. The handset device sends information on the selection performed by the user to the base device 20. In this case, the base-side controller 22 makes a determination of YES in S70.

Next, the base-side controller 22 sends a MESSAGE including the user-selected result (S72). The MESSAGE is received by the SIP server 106, and then transferred to the extension network 110. The MESSAGE is then received by the base device 120 (cf. S20 of FIG. 5). The base device 120 sends '200 OK' as the response to the MESSAGE (cf. S22 of FIG. 5). '200 OK' is received by the SIP server 106, and transferred to the extension network 10. '200 OK' is then received by the base device 20 (S74). When S74 ends, processing proceeds to S76.

In S76, the base-side controller 22 changes the stored contents of the status storage area 30. Specifically, the base-side controller 22 changes the status of the handset device in which the destination information input operation had been executed in S60 to "CALLING". When S76 ends, processing proceeds to S80 of FIG. 8.

The user who placed the telephone call in S60 can cancel the call. For example, the user can carry out a cancel operation by operating the hook key of the operation portion 56 of the handset device. In this case, this handset device sends information denoting that a cancel operation has been executed to the base device 20. The base-side controller 22, upon receiving this information, makes a determination of YES in S80. When the determination in S80 is YES, the base-side controller 22 changes the status of the handset device in which the destination information input operation had been executed in S60 of FIG. 7 to "IDLE" (S82). That is, the base-side controller 22 returns the status of the handset device which was changed to "CALLING" in S76 of FIG. 7 back to "IDLE". The call request sending process is terminated when S82 ends.

The base-side controller 22 monitors the reception of '200 OK (cf. S42 of FIG. 6) having been sent from the extension network 110 as the response to the INVITE (S84). When the determination here is NO, processing returns to S80. Conversely, when a determination of YES is made in S84, the base-side controller 22 sends an ACK (S86). The ACK is received by the SIP server 106, and is transferred therefrom to the extension network 110. The ACK is then received by the base device 120 (cf. S44 of FIG. 6). Consequently, a RTP communication session for calling is established (S88). As a result of this, it is possible for a call to be put through between the handset device of the extension network 110 (specifically, the handset device that had taken the call) and the handset device in which the destination information input operation had been executed in S60 of FIG. 7.

Next, the base-side controller 22 changes the stored contents of the status storage area 30 (S90). Specifically, the base-side controller 22 changes the status of the handset device in which the destination information input operation had been executed in S60 of FIG. 7 to "TALKING". The call request sending process is terminated when S90 ends.

(Call Completion Process)

Figure 9:
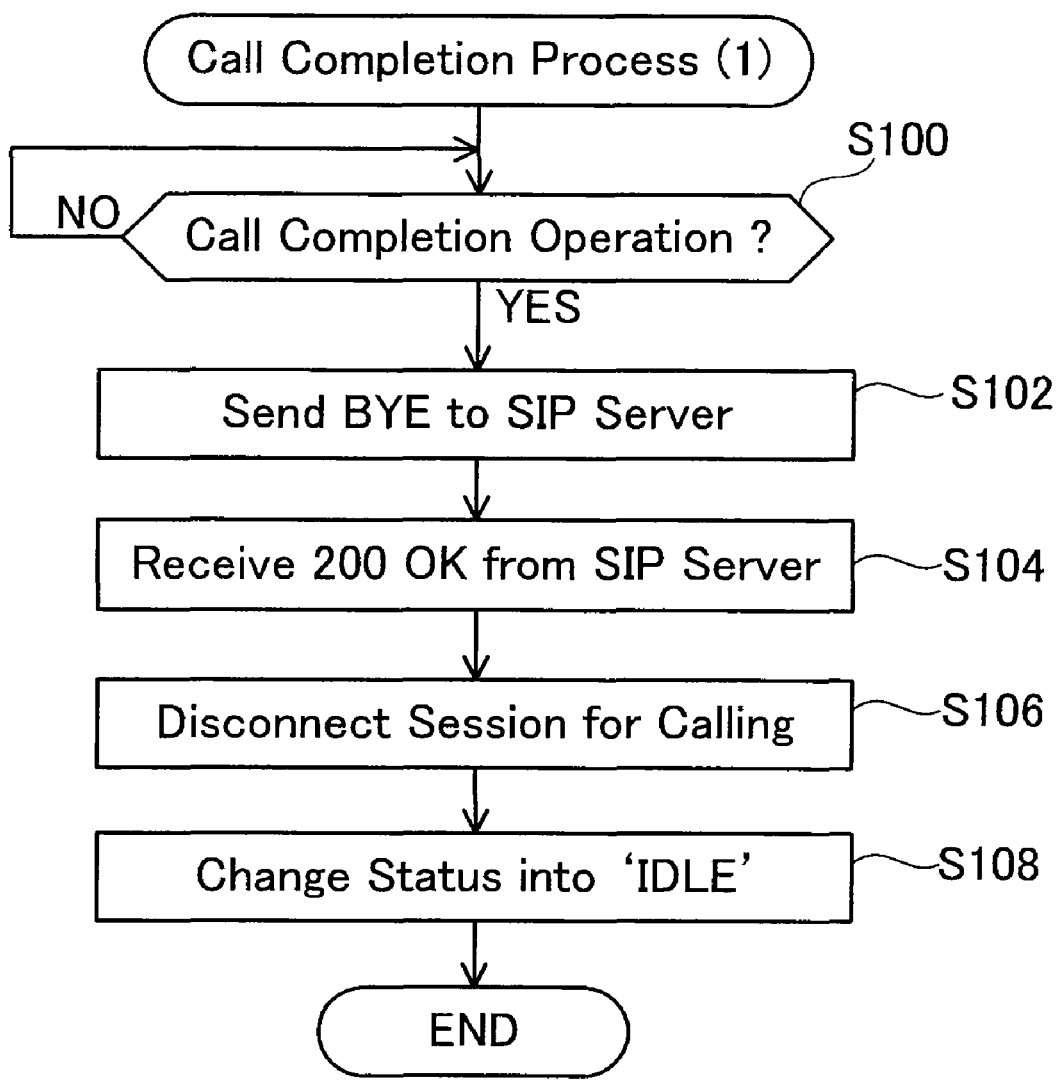
FIG. 9 shows a flowchart of a call completion process.
Figure 10:
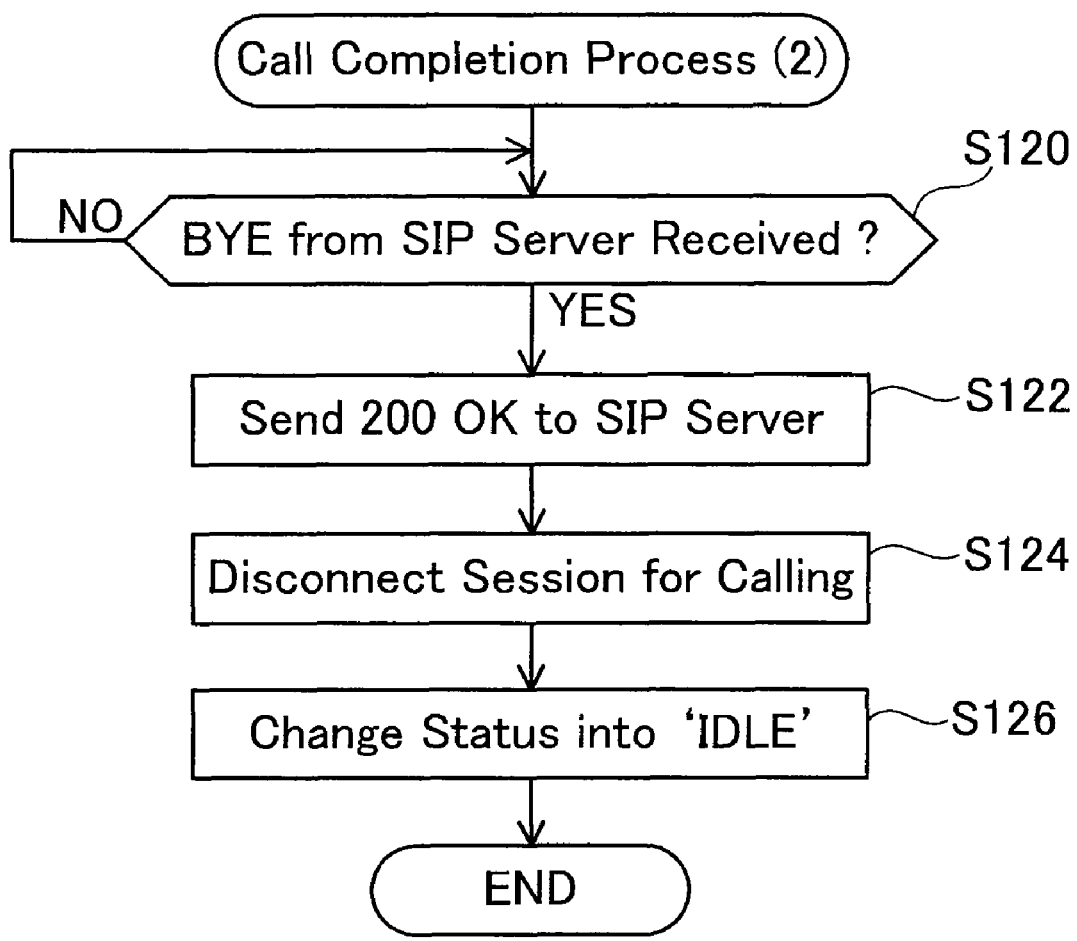
FIG. 10 shows a flowchart of a call completion process.

Next, the contents of a call completion process will be explained. For example, when a call (RTP) is established between the handset device of the extension network 10 and the handset device of the extension network 110, either user can execute a call completion operation. For example, when a call completion operation is executed in the handset device of the extension network 10 first, the base device 20 of the extension network 10 takes the lead in executing the call completion process. FIG. 9 shows a flowchart of this call completion process performed by the base-side controller 22. In a contrary case, when the call completion operation is executed in the handset device of the extension network 110 first, then the base device 120 of the extension network 110 takes the lead in executing the call completion process. In this case, the base device 20 of the extension network 10 executes the call completion process following the aforesaid lead of the base device 120. FIG. 10 shows a flowchart of the call completion process performed by the base-side controller 22 in this case.

First, the contents of the call completion process shown in the flowchart of FIG. 9 will be explained. The handset device sends information denoting that a call completion operation has been executed thereon to base device 20. In this case, the base-side controller 22 makes a determination of YES in S100. When the determination in S100 is YES, the base-side controller 22 sends BYE to the SIP server 106 (S102). Furthermore, in the present embodiment, the explanation below is given with the example in which BYE is sent to the extension network 110. The SIP server 106 transfers BYE to the extension network 110. BYE is thereby received by the base device 120. The base device 120 sends '200 OK' as the response to BYE. '200 OK' is received by the SIP server 106, and transferred to the extension network 10. '200 OK' is thereby received by the base device 20 (S104). Consequently, the RTP communication session for calling is disconnected (S106).

Next, the base-side controller 22 changes the stored contents of the status storage area 30 (S108). Specifically, the base-side controller 22 changes the status of the handset device in which the call completion operation had been executed in S100 to "IDLE". The call completion process is terminated when S108 ends.

Next, the contents of the call completion process shown in the flowchart of FIG. 10 will be explained. The base-side controller 22 monitors the reception of BYE (S120). Furthermore, in this embodiment, the explanation below is given with the example in which the BYE that was sent from the extension network 110 is received in the extension network 10. When the determination in S120 is YES, the base-side controller 22 sends '200 OK' as the response to BYE (S122). '200 OK' is received by the SIP server 106, and transferred to the extension network 110. '200 OK' is then received by the base device 120 (cf. S104 of FIG. 9). Consequently, the RTP communication session for calling is disconnected (S124).

Next, the base-side controller 22 changes the stored contents of the status storage area 30 (S126). Specifically, the base-side controller 22 changes the status of the handset device that had been the target of the BYE received in S120 to "IDLE". Furthermore, the above-mentioned BYE included the ID of the targeted handset device (for example, ID "0003"). For this reason, the base-side controller 22 knows which handset device should have its status changed to "IDLE". The ID of the targeted handset device may be included in the above-mentioned BYE by utilizing the following strategy. For example, at the stage when the RTP communication session for calling is established between the handset device 50 of the extension network 10 and the handset device 150 of the extension network 110, each handset device 50, 150 sends the own ID to one another. In this case, the handset device 50 can know the ID of the handset device 150, and the handset device 150 can know the ID of the handset device 50. If the call completion operation is executed in the handset device 150, the handset device 150 sends information to the base device 120, wherein this information denotes that the call completion operation is executed, and this information includes the ID of the handset device 50 as the target. Thus, the base device 120 can know that the target is the handset device 50, and send BYE including the ID of the handset device 50 to the extension network 10.

According to the above-mentioned telephone network system 2, MESSAGE for selecting whether or not the call is an urgent call can be sent to the source of INVITE (e.g. extension network 110). By utilizing the MESSAGE, the user of the extension network 110 can select if the call that the user is currently making is of an urgent business or not. When the call being urgent is selected, the base device 20 of the extension network 10 sends a call request notice instruction to all of the handset devices 50, 70, 80. That is, the call request notice instruction is not only sent to a handset device having the status of "IDLE", but also to the handset devices having other statuses. As a result of this, the call request notice is executed in all the handset devices 50, 70, 80. Conversely, when the call being urgent is not selected, the call request notice instruction is only sent to the handset device having the status of "IDLE". That is, the call request notice instruction is not sent to a handset device having the other status. Because the call request notice is not carried out in the handset device having the other status, e.g. in the handset being used by a user, thus the user's call thereof is not interrupted. According to this telephone network system 2, it is possible to carry out a call request notice that reflects the intention of the user (caller) that is placing the telephone call.

Further, in this above-mentioned telephone network system 2, when an INVITE is received, a determination is made as to whether or not all the handset devices 50, 70, 80 have the status of "IDLE" (cf. S14 of FIG. 5). That is, a determination is made as to whether or not a handset device having a status other than the status of "IDLE" exists. When a negative determination is obtained (that is, in a case where all of the handset devices of the extension network are IDLE status), the call request notice instruction is sent to all of the handset devices 50, 70, 80 without sending the MESSAGE to the source of the INVITE. In this configuration, a call request notice can be reasonably carried out without waiting for the response including the selected result. According to this configuration, the call request notice can be carried out immediately after the INVITE has been received.

A part of technique disclosed in the embodiment will be described. The telephone device described hereinabove may further comprise a determination device configured to determine, based on the stored contents of the status storage device, whether or not a receiver device having the busy status exists when the call request is received by the call request receiving device. As described hereinabove, the status storage device may be configured to store one of the two types of status, i.e. the idle status or the busy status, and may be configured to store any one of the three or more types of status (for example, a power OFF status, a busy status, a call request sending status, a call request notice in progress status, and an idle status). In the latter case, the determination device may regard the busy status, call request sending status and call request notifying status collectively as the busy status, and may determine whether or not a receiver device having any of these statuses exists. The selectable information sending device may send the above-mentioned selectable information on a condition that a positive determination is obtained by the determination device. Furthermore, the above-mentioned telephone device may further comprise a third notice instruction sending device configured to send the call request notice instruction to all the above-mentioned plurality of receiver devices on a condition that a negative determination is obtained by the above-mentioned determination device.

According to this configuration, the selectable information is not sent to the source of the call request when all the receiver devices are in the idle status. Since the selectable information is not sent to the source of the call request, the call request notice may be carried out immediately subsequent to the call request being received.

The above-mentioned selectable information may be information for selecting one type of call request from among an urgent type call request and a normal type call request. That is, the selectable information may be information for selecting whether or not the call being made is of an urgent business. In this case, the above-mentioned first type call request may be the urgent type of call request, and the above-mentioned second type of call request may be the normal type of call request.

The status storage device may be is configured to store a table including, for each of the plurality of receiver devices, an association of an ID of the receiver device and a status of the receiver device.

The telephone device may further comprise a negative response sending device configured to send a negative response to the source of the call request received by the call request receiving device on a condition that there is no receiver device having the idle status when the selected result information received by the selected result information receiving device is the second type of call request. In this configuration, the source of the call request receives the negative response, thus knows that a destination of the call request is busy.

The telephone device may further comprise a positive response sending device configured to send a positive response to the source of the call request received by the call request receiving device on a condition that a predetermined operation is performed on any one of the plurality of receiver devices that had received the call request notice instruction sent by the first notice instruction sending device or the second notice instruction sending device. In this configuration, the source of the call request receives the positive response, and a session is established between the source and the destination of the call request.

The telephone device may carry out telephone communication using the SIP (Session Initiation Protocol). Other protocols may also be used. For example, "H.323", "MGCP (Media Gateway Control Protocol)", "H.248/MEGACO (Media Gateway Control)" and the like may also be used.

The call request may also be an INVITE command. Further, the above-mentioned selectable information may also be sent in accordance with a SIP MESSAGE command. In this case, the selectable information may be sent as text data. Further, the selected result information may also be sent in accordance with the SIP MESSAGE command. In this case, the selected result information may be sent as text data.

The above-described embodiment can be modified in various ways. Examples of variations of the above-described embodiment are given below.

(1) For example, in the status storage area 30, one of two types of status: BUSY status or IDLE status; may be stored. Further, for example, a power OFF status may also be included among the statuses stored in the status storage area 30. In this case, when a determination of YES has been made in S14 of FIG. 5, the call request notice instruction may either be sent or not be sent to the handset device having the status of power OFF. In the latter case, the handset device having the status of power OFF may not be regarded as a handset device configuring the extension network 10. Even in this case, as shown in S30 of FIG. 6, it is equivalent to the call request notice instruction being sent to all of the handset devices.

(2) In the above-described embodiment, all of the handset devices 50, 70, 80 configuring the extension network 10 are the cordless type. However, a handset device that is connected to the base device 20 via a wire can be added (hereinafter called a wired type handset device). When the wired type handset device has a status of BUSY, the expression "the wired type handset device is executing a call request notice", for example, signifies that a call waiting type sound is being outputted from the speaker of the wired type handset device. In order to realize this, the base-side controller 22 may send a call request notice instruction to a sound output circuit so that the above-mentioned sound is outputted from the speaker of the wired type handset device. Conversely, when the wired type handset device has the status of IDLE, the expression "the wired type handset device is executing a call request notice", for example, signifies that a ringing sound will be outputted from the speaker disposed in the base device 20. In order to realize this, the base-side controller 22 may send a call request notice instruction to a sound output circuit so that the above-mentioned sound is outputted from the speaker disposed in the base device 20. When these configurations are employed, the terminology "send a call request notice instruction to the wired type handset device" signifies the sending of the call request notice instruction to the above-mentioned sound output circuit. That is, the above-mentioned sound output circuit may be considered to be one element configuring the wired type handset device.

What is claimed is:

1. A telephone device configured to connect with a plurality of receiver devices, the telephone device comprising:
   a status storage device configured to store a status of each of the plurality of receiver devices;
   a processor; and
   memory storing computer-executable instructions that, when executed by the processor, cause the telephone device to function as:
      a call request receiving device configured to receive a call request;
      a selectable information sending device configured to send selectable information for selecting one type of call request from among a plurality of types of call requests to a source of the call request received by the call request receiving device;
      a selected result information receiving device configured to receive selected result information sent from the source;
      a first notice instruction sending device configured to send a call request notice instruction to all of the plurality of receiver devices when the selected result information received by the selected result information receiving device indicates a first type of call request, even if the plurality of receiver devices includes a receiver device having a busy status;
      a receiver device specifying device configured to specify one or more receiver devices having an idle status from among the plurality of receiver devices based on contents of the status storage device when the selected result information received by the selected result information receiving device indicates a second type of call request; and
      a second notice instruction sending device configured to send the call request notice instruction to the one or more receiver devices specified by the receiver device specifying device, but not to receiver devices having the busy status.

2. The telephone device as in claim 1, wherein the memory stores computer-executable instructions that, when executed by the processor, cause the telephone device to further function as:
   a determination device configured to determine, based on the stored contents of the status storage device, whether a receiver device having the busy status exists when the call request is received by the call request receiving device,
   wherein the selectable information sending device is configured to send the selectable information on a condition that a positive determination is obtained by the determination device.

3. The telephone device as in claim 2, wherein the memory stores computer-executable instructions that, when executed by the processor, cause the telephone device to further function as:
   a third notice instruction sending device configured to send the call request notice instruction to all of the plurality of receiver devices on a condition that a negative determination is obtained by the determination device.

4. The telephone device as in claim 1, wherein
   the selectable information is information for selecting one type of call request from an urgent type of call request and a normal type of call request,
   the first type of call request is the urgent type of call request, and
   the second type of call request is the normal type of call request.

5. The telephone device as in claim 1, wherein
   the status storage device is configured to store, for each of the plurality of receiver devices, an ID of the receiver device and a status of the receiver device.

6. The telephone device as in claim 1, wherein the memory stores computer-executable instructions that, when executed by the processor, cause the telephone device to further function as:
   a negative response sending device configured to send a negative response to the source of the call request received by the call request receiving device on a condition that there is no receiver device having the idle status when the selected result information received by the selected result information receiving device is the second type of call request.

7. The telephone device as in claim 1, wherein the memory stores computer-executable instructions that, when executed by the processor, cause the telephone device to further function as:
   a positive response sending device configured to send a positive response to the source of the call request received by the call request receiving device on a condition that a predetermined operation is performed on any one of the plurality of receiver devices that had received the call request notice instruction sent by the first notice instruction sending device or the second notice instruction sending device.

* * * * *